Jan. 7, 1947.　　　　　L. IVERSEN　　　　2,413,920
FLYING SHEAR
Filed Aug. 21, 1945　　　　5 Sheets-Sheet 3
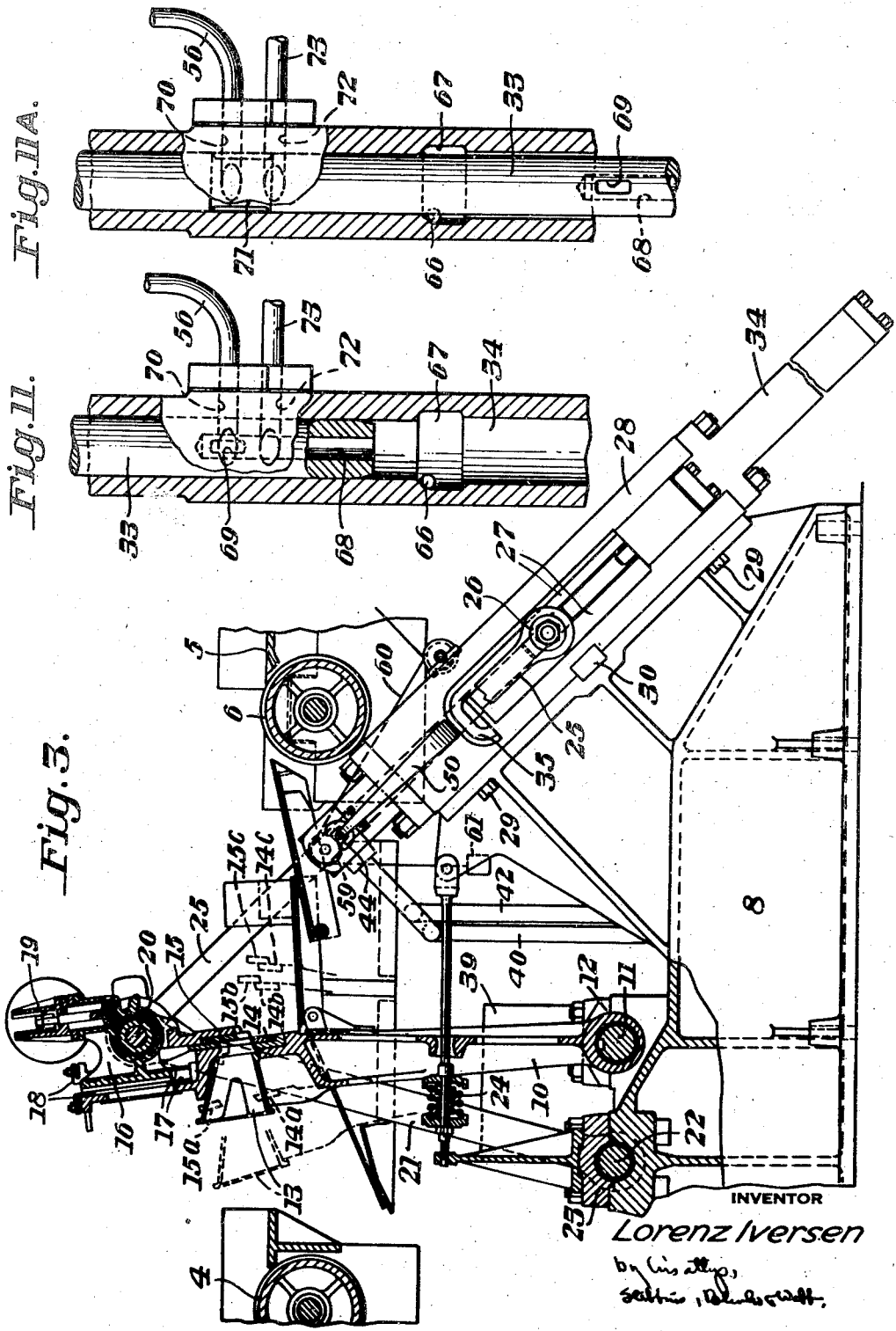
INVENTOR
Lorenz Iversen

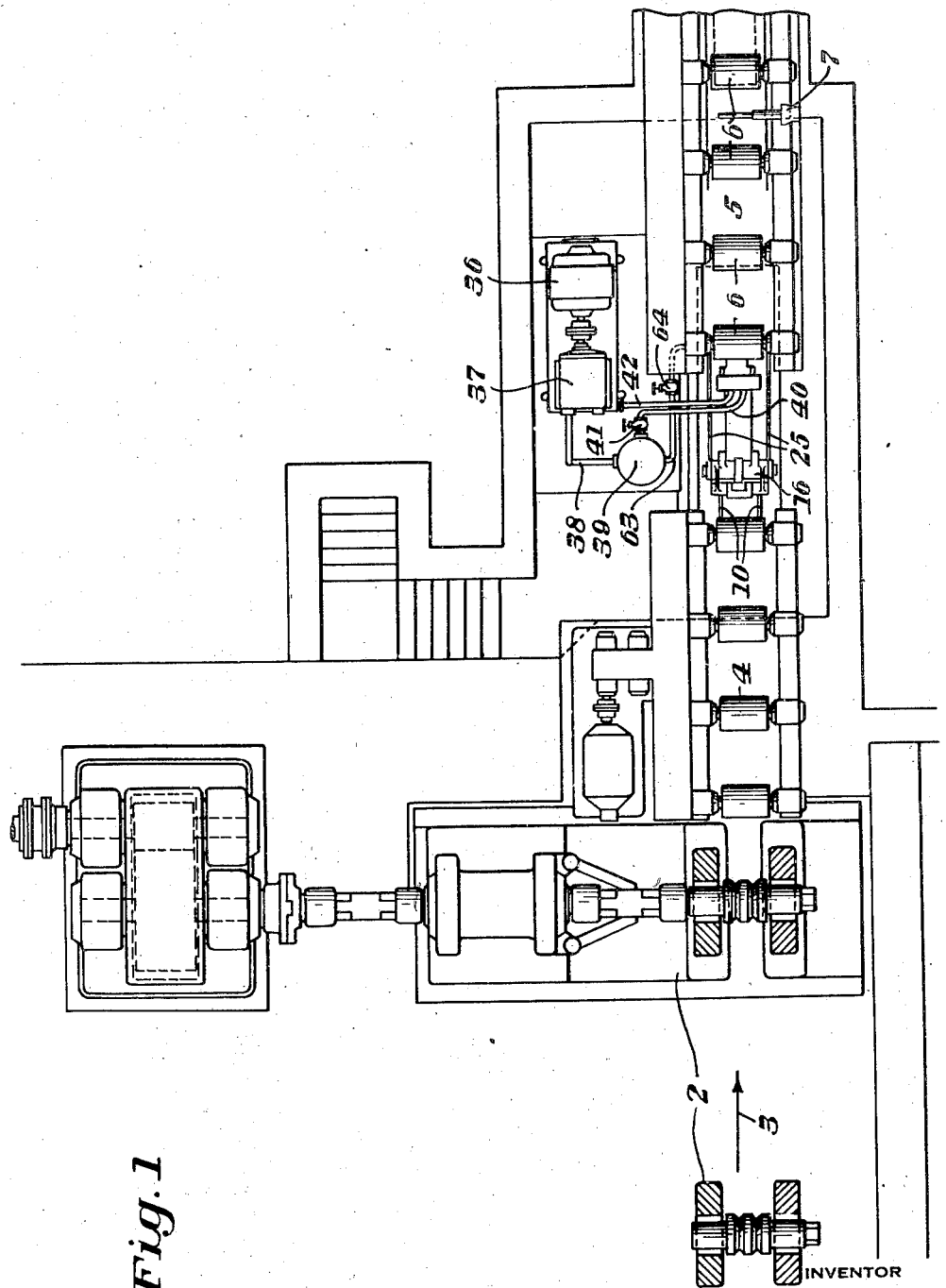

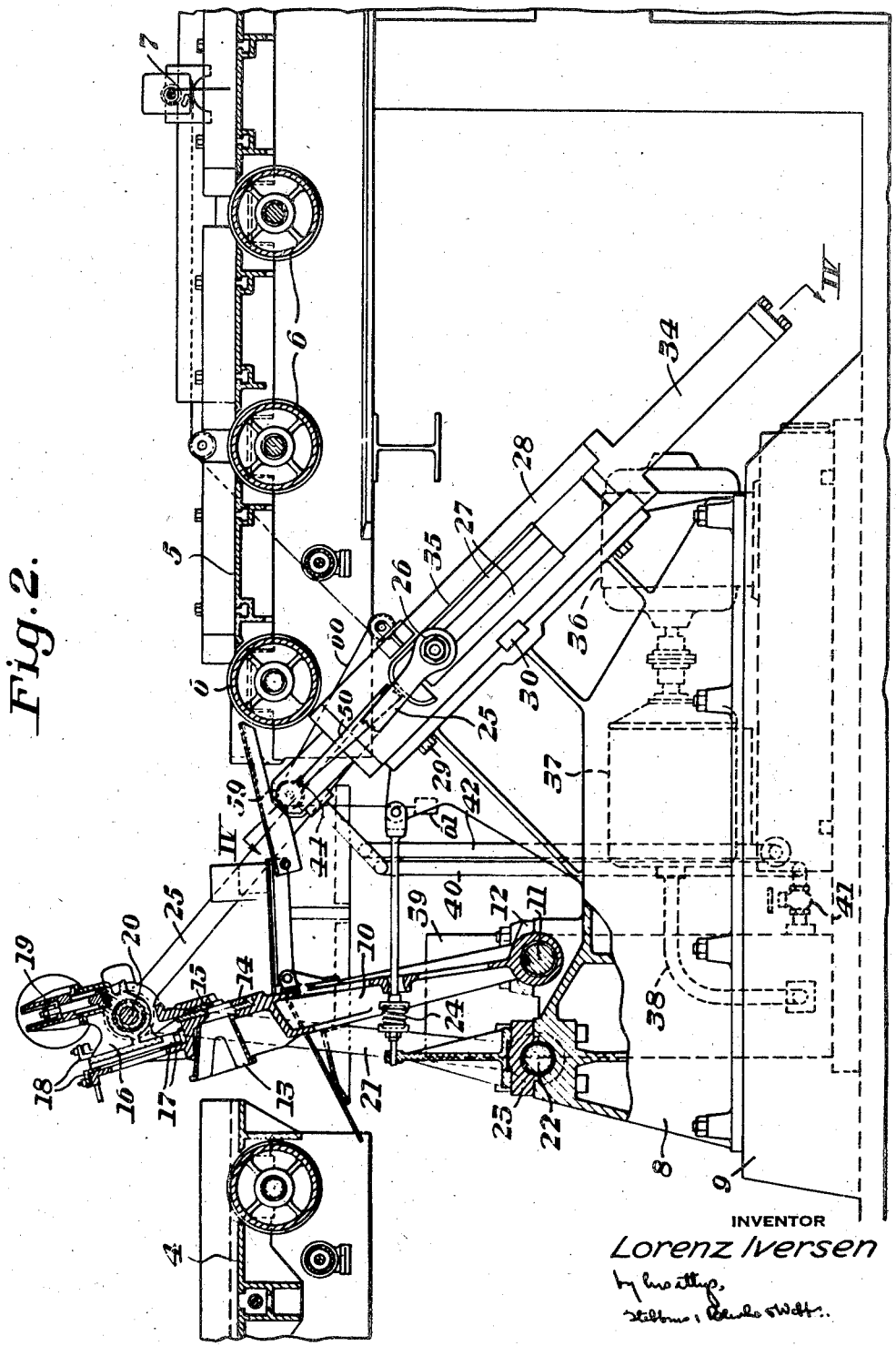

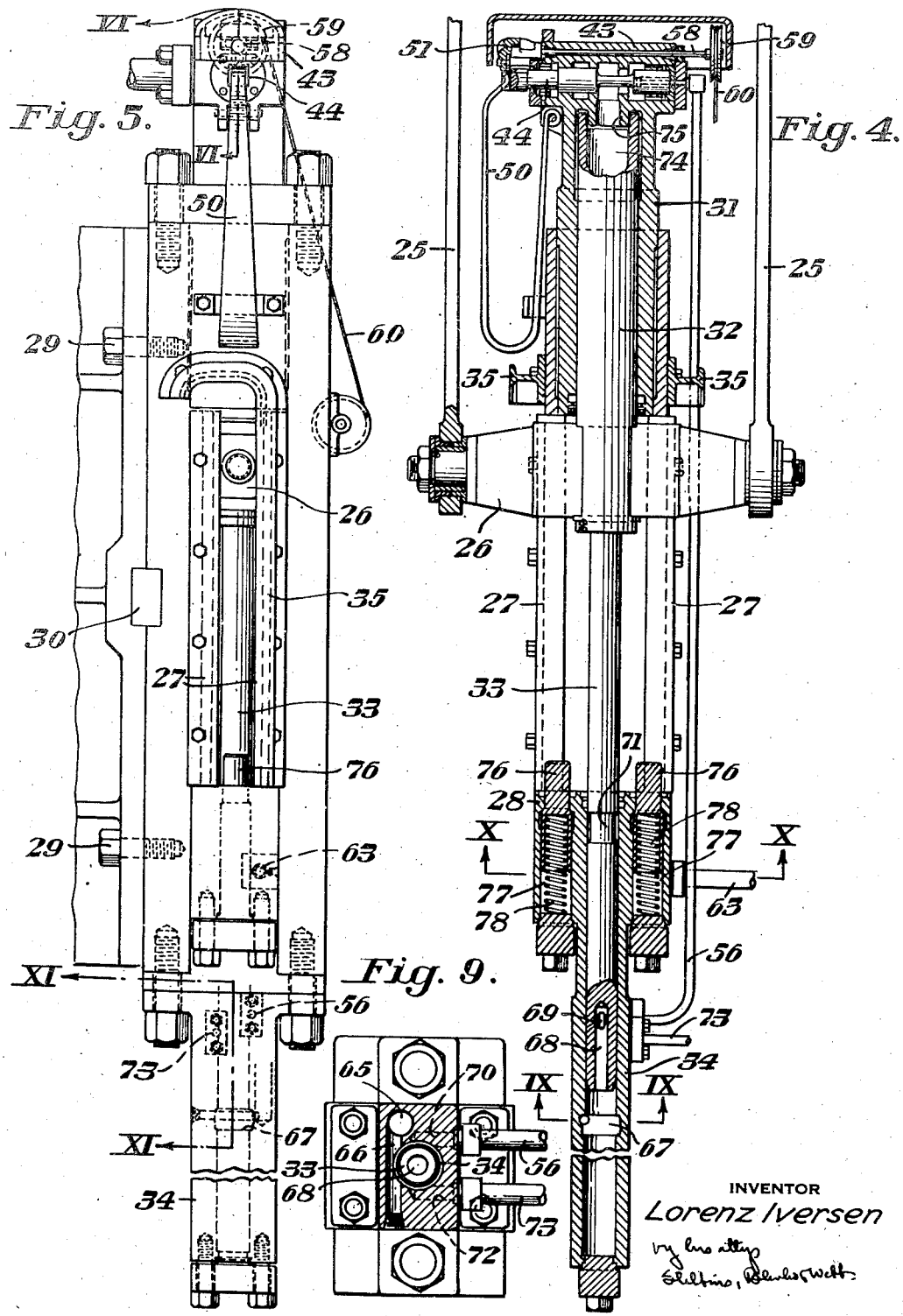

Jan. 7, 1947.  L. IVERSEN  2,413,920
FLYING SHEAR
Filed Aug. 21, 1945  5 Sheets-Sheet 5
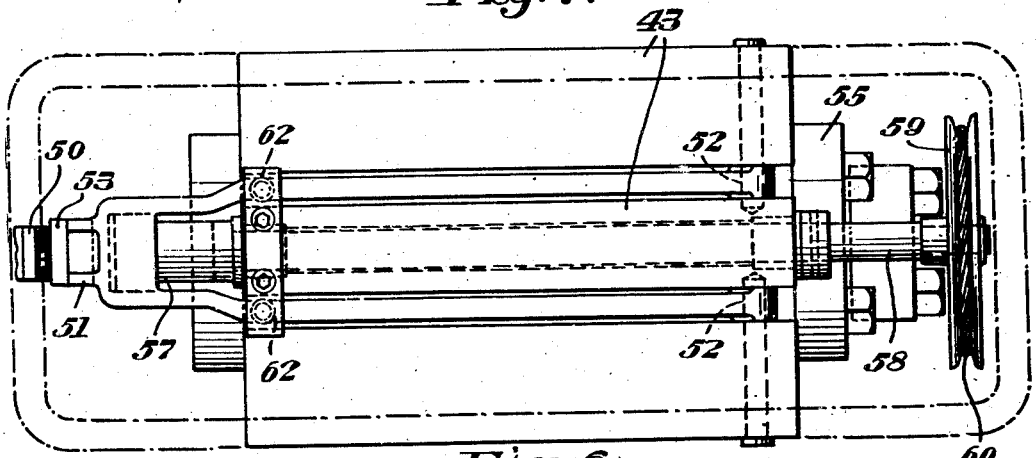
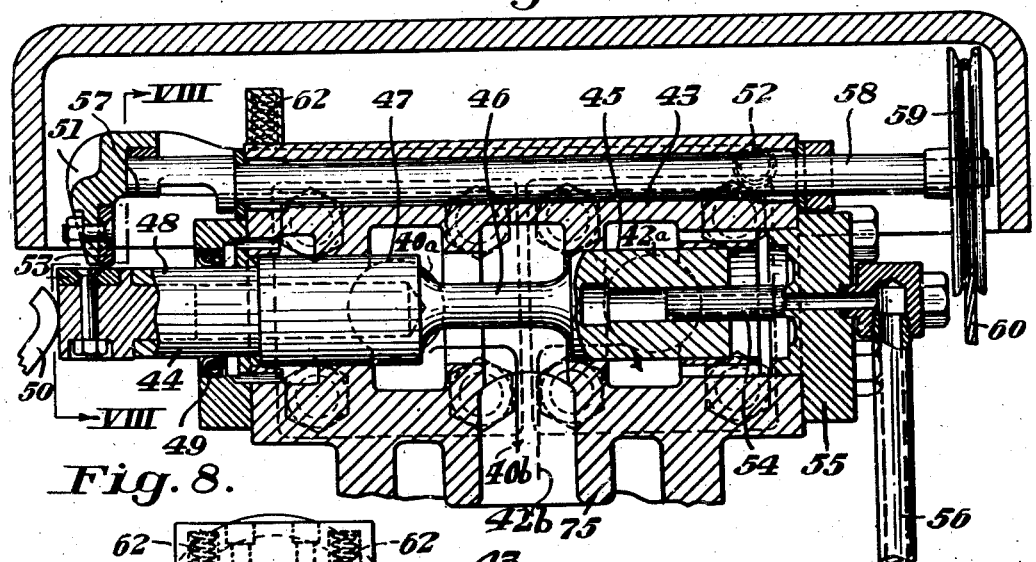
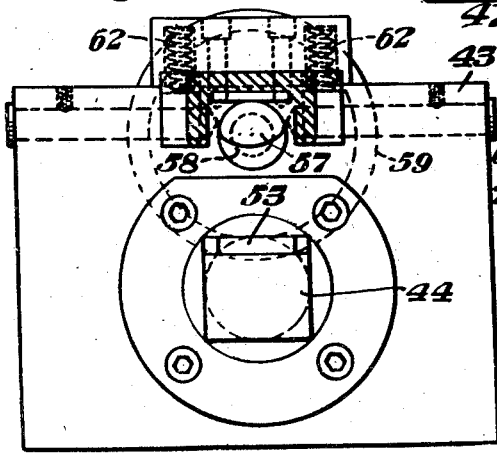
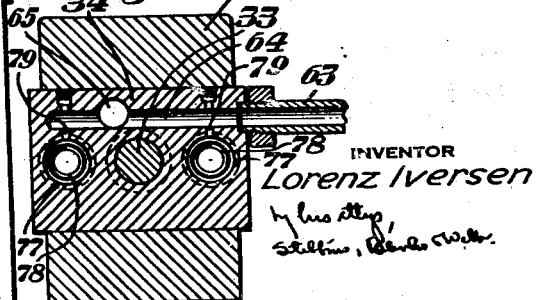
INVENTOR
Lorenz Iversen Patented Jan. 7, 1947

2,413,920

UNITED STATES PATENT OFFICE 2,413,920

FLYING SHEAR

Lorenz Iversen, Pittsburgh, Pa., assignor to Mesta Machine Company, Pittsburgh, Pa., a corporation of Pennsylvania Application August 21, 1945, Serial No. 611,781

7 Claims. (Cl. 164—56)

This invention relates to flying shears of the reciprocable type, such as are generally used in rod and bar mills.

The original form of flying shears of the type here under consideration is disclosed in Edwards Patent 505,512, September 26, 1893. Generally speaking, it consists of a rockable arm carrying shear blades which are relatively movable to effect a shearing cut on the rocking of the arm, with appropriate linkages for causing relative movement of the shear blades upon rocking of the arm and power means for rocking the arm. Edwards proposed that the shear arm should be rocked by a hydraulic cylinder, and further refinements of the actuating mechanism are described in Edwards Patent 587,363, August 3, 1897. The hydraulic mechanisms thus proposed were early superseded by steam-operated cylinders. Carroll Patent 787,324, April 11, 1905, discloses one form of steam control valve. The substitution of steam for liquid as a motive force was not so much for purposes of economy as to increase the operating speed of the shear. As a matter of fact, shears of this sort are generally very wasteful of steam and this fact has militated against their use.

The shearing problem has become more acute with increased mill speeds and the imposition of closer length tolerances. In the older mills, where the bars moved at more moderate speeds and the length tolerances were reasonably liberal, the older forms of actuating and control mechanisms met the requirements, albeit the shears were expensive to operate because of excessive steam requirements. Under present-day conditions, however, and with even higher mill speeds in prospect, the known designs are inadequate. The shear actuating mechanism must be capable of accelerating the shear from a position of rest to a speed which, at the time of cutting, approximately equals the bar speed, as otherwise cobbles might result. The forward motion of the shear arm must then be checked and the arm brought to rest and then moved in the reverse direction to the initial position for another cut. All this must be done in a very limited time cycle, and without undue shock, so that the mechanism will not wrack itself to pieces or be subject to rapid wear or misadjustment. Moreover, in order to hold within close length tolerances on the cut bars, the shear must function uniformly on every stroke. It is common practice to employ a "flag" in the path of the moving bar to actuate the shear. When the oncoming bar moves the flag, the shear is tripped to effect a cut. A brief time lag between the tripping of the flag and the initiation of the cut is permissible, and can be compensated for by adjusting the position of the flag on the run-out table, but whatever the time lag may be, it must be a uniform one for each actuation. Even a small variation will result in successive bars being cut to different lengths, the variation becoming greater with higher mill speeds. Since it is desirable that the bars be cut within very close tolerances, it becomes important to provide a shear which is in reality a precision instrument.

My improved shear meets these requirements and is suitable for cutting at very high speeds within very close limits of accuracy. Instead of using steam as a motive fluid, I employ a liquid, preferably oil. However, instead of using the older hydraulic mechanisms, which are unsatisfactory for present-day purposes, I employ a cylinder and plunger mechanism, with controls so arranged that when the cycle is once initiated, the mechanism functions powerfully, swiftly and with extreme time precision.

In the accompanying drawings, illustrating a present preferred embodiment of the invention, Fig. 1 is a top plan view of part of a bar mill employing my improved shear;

Fig. 2 is a side elevation of the shear mechanism with parts of the feed table and the runout table shown in section, the mechanism being shown in position for initiating a stroke;

Fig. 3 is a side elevation, partly in section, showing further details of the shear proper, the mechanism being in the position occupied at approximately mid-stroke;

Fig. 4 is a section on the line IV—IV of Fig. 2;

Fig. 5 is a side elevation of the apparatus shown in Fig. 4;

Fig. 6 is a section to enlarged scale on the line VI—VI of Fig. 5, showing the fluid control valve mechanism, its valve being shown in another position;

Fig. 7 is a top plan view of the apparatus shown in Fig. 6;

Fig. 8 is an end view to enlarged scale corresponding to the uppermost portion of Fig. 5;

Fig. 9 is a section on the line IX—IX of Fig. 4;

Fig. 10 is a section on the line X—X of Fig. 4;

Fig. 11 is a section, partly broken away, and taken generally on the line XI—XI of Fig. 5; and Fig. 11a is a view, corresponding to Fig. 11, but showing the plunger in a different position.

Referring first to Fig. 1, I have diagrammatically shown the last two stands of a bar mill 2, wherein the bars being rolled travel in the direction of the arrow 3. As they issue from the last stand of the bar mill they pass over a roll table 4 and are thereby fed to the shear which is the subject-matter of this specification. The cut lengths leaving the shear are carried away by a runout table 5, having driven rollers 6, which are operated at a speed higher than the mill speed so as to separate the trailing end of a sheared length from the forward end of the next succeeding length. A flag 7, adjustable along the run-out table, is arranged to be engaged by the leading ends of successive lengths, so as to actuate the shear. The cut length is primarily determined by the positioning of the flag 7 along the run-out table.

General arrangement of the shear mechanism

See particularly Figs. 2 and 3.

There is a base 8 secured to a foundation 9. The arm 10 of the shear is carried by a shaft 11 working in bearings 12 formed on the base 8. Near its upper end the arm 10 is provided with a bell mouth 13 through which the bars travel from the feed table 4. A fixed shear knife 14 is secured to the arm 10 at the exit end of the bell mouth 13, and a movable knife 15 coacts with the fixed knife 14 to shear the bars. In Fig. 3 the shear arm is shown in approximately mid-position, the shear blades traveling during a cutting stroke from the positions 14a—15a to the positions 14b—15b.

The shear knife 15 is carried by a head 16 slidable in guides 17 formed in the arm 10. Gibs 18 are provided for taking up wear and a dash-pot 19 of usual construction is provided for cushioning the movement of the head 16.

A shaft 20 is mounted in the head 16 and forms an attachment for the upper ends of links 21 arranged at an angle to the arm 10 and pivoted at their lower ends on a shaft 22 carried by bearings 23 on the base 8. This linkage is such that when the arm 10 is rocked, the shear blade 15 is caused to slide up or down on the arm 10.

A spring buffer 24 is provided as a stop for the return, i. e., the right-to-left motion, of the arm 10.

The shaft 20, in addition to providing a connection for the links 21, also provides a connection for operating links 25, which serve to transmit the motive power for the shear. These links extend forwardly and downwardly at an angle of about 45 deg. to the vertical and at their lower ends are pivoted to a cross-head 26, movable between guides 27 in a housing indicated generally by the reference character 28. The housing 28 is fastened to the base 8 by bolts 29 and is secured against movement by a cross-key 30.

General arrangement of the motive unit

See particularly Figs. 1, 4 and 5.

The housing 28 carries a motive cylinder 31 bored to receive a plunger 32. The projecting end of the plunger is slotted to receive the cross-head 26. A tail plunger 33, coaxial with the plunger 32, extends downwardly therefrom into a tail cylinder 34 secured to the lower end of the housing 28.

Splash guards 35 are provided at each side of the housing 28 above the guides 27 so as to protect them from water and scale.

The prime mover for the shear is an electric motor 36 (see Fig. 1) which drives an oil pump 37. Oil under high pressure (e. g. 2750 lbs. per sq. in.) is supplied by the pump 37 through a conduit 38 to a pressure chamber 39. A conduit 40 having an adjusting valve 41 therein leads from the pressure chamber 39 to the cylinder 31 through the control valve shown in detail in Fig. 6 and hereinafter fully described. It will suffice for the moment to say that oil under very high pressure is made available by the conduit 40 and upon the control valve being opened it flows into the cylinder 31 to effect a power stroke of the plunger 32, the movement of the plunger being transmitted through the cross-head 26 and links 25 to the shear proper. The return stroke of the shear is effected by actuating the control valve of Fig. 6 so as to cut off the supply of oil under pressure and release the oil contained in the cylinder 31 through an exhaust pipe 42 leading back to the sump of the pump 37. When the pressure in the cylinder 31 is thus released, oil under constant pressure in the tail cylinder 34 supplies the necessary force for returning the mechanism to its original position.

Control valve

See particularly Figs. 4–8 inclusive.

The control valve is of the balanced piston type. In Fig. 4 it is shown in position to be tripped (exhaust position) and in Fig. 6 it is shown after having been tripped so as to connect the pressure chamber 39 with the motive cylinder 31 (pressure position). The valve consists of a body 43 formed in the upper end of the cylinder 31 and cross bored to accommodate a piston valve 44. The piston valve has an enlarged portion 45, a neck portion 46, an enlarged portion 47, and a projecting stem 48 provided with a packing 49. The valve functions by longitudinal movement. It is biased to the exhaust position of Fig. 4 by a hairpin spring 50 whose free end bears against the outer end of the stem 48. A hook 51 pivoted at 52 engages the end of the stem 48 when the valve is in the exhaust position and prevents movement of the valve from that position until and unless the hook 51 is raised out of engagement with the valve stem. Cooperating hardened latch-plates 53 are provided on the stem 48 and the hook 51 since the hook is actuated on every cutting stroke of the shear.

The portion 45 of the piston valve 44 is bored to receive a fixed stem 54 formed on the head 55 of the valve body. The stem 54 is hollow and is in communication with an oil pressure pipe 56. Assuming that the oil in the pipe 56 is under sufficient pressure, raising of the hook 51 so as to unlatch the piston valve will result in this oil pressure causing the piston valve to move from the exhaust position of Fig. 4 to the pressure position of Fig. 6.

As above stated, oil under pressure flows to the control valve from the pressure chamber 39 through a conduit 40. The inlet of the conduit 40 to the valve chamber is shown at 40a in Fig. 6 and, with the valve in the position there shown, oil flows to the cylinder 31 as indicated by the arrow 40b. The opening from the valve chamber to the exhaust pipe 42 is indicated at 42a in Fig. 6, and the outflow of oil is indicated by the dotted arrow 42b.

The raising of the hook 51 is effected by a cam 57 (see Figs. 6 and 8) on the end of a shaft 58. The shaft 58 carries a pulley 59 and a light cable 60 lies in the groove of this pulley. The cable is connected to the flag 7 in known manner so that upon actuation of the flag the shaft 58 is rotated a half turn. Return movement of the pulley upon resetting of the flag 7, after a bar has moved out from under it, may be effected in any convenient manner, e. g. by a counterweight 61.

The half rotation of the shaft 58 cams the hook 51 upwardly from the latch position of Fig. 4 to the trip position of Fig. 6. Thereupon (assuming pressure in the pipe 56) the piston valve 44 is moved to the position of Fig. 6. Resetting of the flag rotates the shaft 58 back to its original position and, assuming that the valve 44 is in the position of Fig. 6, the hook rests on the latch-plate 53 of the valve stem 48 until pressure in the pipe 56 is relieved. Thereupon the spring 50 forces the valve back to the position of Fig. 4 and as soon as the end of the valve stem 48 reaches its innermost position, the hook 51 moves downwardly under the influence of its own weight and of coil springs 62 to latch the valve in the exhaust position.

The mass of the piston valve is relatively small and the fluid pressures to which it is subjected are substantially balanced out. In consequence, the movement from exhaust to pressure position is exceedingly rapid. A large free channel for the passage of oil is thus immediately provided and a power stroke on the plunger 32 is therefore initiated with great rapidity and maximum force, as is required for extreme shearing conditions.

Tail cylinder mechanism

See particularly Figs. 4, 5 and 9–11a inclusive.

The tail cylinder is provided with pressure oil from the pressure chamber 39 by a pressure pipe 63 having a valve 64 therein (see Fig. 1). The pipe 63 connects with a passage 64 in the tail cylinder 34 (see Fig. 10). The passage 64 communicates with a longitudinal passage 65 which extends to a point about ⅔ of the way down the cylinder and terminates in a transverse passage 66 (see Fig. 9). The tail cylinder proper is of enlarged diameter at this point, as indicated at 67. Above the enlarged annulus 67 the tail cylinder makes a close working fit with the tail plunger 33, but below the annulus 67 it is of larger diameter, as best shown in Fig. 11a. Because of this arrangement, oil under pressure may flow from the pressure pipe 63 to the bottom end of the cylinder and thus provide the necessary force for effecting the return stroke of the shear. In operation. the oil in the tail cylinder will always be under pressure, but since the tail plunger 33 is of materially smaller cross-section than the motive plunger 32, the admission of high pressure oil to the motive cylinder 31 will overcome the resistance of the tail plunger to effect a cutting stroke, but upon movement of the piston valve 44 to the exhaust position of Fig. 4, the pressure in the tail cylinder will predominate and cause the return stroke.

Control of pressure to pipe 56

See particularly Figs. 4, 11 and 11a.

It has been explained that the oil in the pipe 56 should be under pressure at the time the flag 7 is tripped to initiate a cut, so that the valve 44 will be moved to the cutting position of Fig. 6, and it has also been explained that the oil pressure in the pipe 56 must be relieved so that the spring 50 may reset the valve 44. The establishment and release of pressure in the pipe 56 is automatically controlled by the movement of the tail plunger 33.

As best shown in Figs. 4 and 11, the bottom end of the tail plunger 33 is hollow, as indicated at 68, the bore 68 communicating with a vent 69 extending to the cylindrical surface of the tail plunger. The tail cylinder 34 is provided with a cross-passage 70 which intercepts the main bore, as shown in Fig. 11. When the mechanism is in the position shown in Fig. 4, the vent 69 registers with the passage 70 so that there is an open conduit from the tail cylinder 34. The pressure pipe 56 terminates in the passage 70 and consequently the pressure of the oil in the reservoir 39 is communicated through the pipe 63, passages 64, 65 and 66, cylinder 34, plunger bore 68, vent 69, passage 70 and pressure pipe 56 to the hollow stem 54. Since the parts are in the position of Fig. 4 when a cutting stroke is to be initiated, pressure is thus available to move the valve 44 to cutting position as soon as the flag 7 is tripped.

As soon as the valve 44 is tripped and the cutting stroke is initiated, the tail plunger 33 moves downwardly in the cylinder 34 and the vent 69 is immediately moved out of registry with the passage 70. The tail plunger is provided with a portion 71 of reduced diameter and as the cutting stroke nears its end, this reduced portion 71 comes into registry with the passage 70. Another passage 72, also intercepting the main bore of the cylinder 34, is provided adjacent the passage 70, and the passage 72 leads to an exhaust pipe 73 through which oil may return to the sump of the pump 37. The reduced portion 71 of the tail plunger is of such length that it may register simultaneously with the passages 70 and 72, and when this occurs the oil pressure in the pipe 56 is relieved, thus permitting the spring 50 to return the piston valve 44 to the position of Fig. 4. Then, as already explained, the pressure in the motive cylinder 31 is released, the pressure in the tail cylinder 34 predominates, and the plungers 32 and 33 are returned to the initial position of Fig. 4 for another stroke.

Cushioning and buffing mechanism

See particularly Figs. 4, 6 and 10.

It is important in an apparatus of this kind that the movement be exceedingly rapid. Cushioning at each end of the stroke therefore becomes important.

Cushioning at the end of the return stroke is effected by providing a hollow 74 in the upper end of the plunger 32 and forming an annulus 75 at the upper end of the cylinder 31 arranged to project into the hollow 74. The cylinder 31 is made somewhat larger at its upper end than the plunger 32, so that oil will not be too tightly trapped in the recess surrounding the annulus 75 when the upper end of the plunger moves into the recess. There will, however, be oil in this space with no means of escape except through the clearances provided and these clearances are made small enough that a suitable cushioning is effected.

The cushioning at the end of the working stroke is similarly obtained. It has already been pointed out that the lower end of the tail cylinder extends beyond the annulus 67 and that therebelow it is of slightly larger diameter than the tail plunger. This arrangement causes entrapment of oil which has no egress except through the clearance between the plunger and the cylinder wall, thus providing a suitable cushion.

As a safety measure, buffers are provided. It is not contemplated that these buffers will function on a stroke of the shear when cutting of steel is actually effected, but if the shear should be tripped when there is no steel present to be cut, the energy normally absorbed in metal cutting must be otherwise absorbed. This is done by permitting over-travel of the shear arm to the position indicated at 14c—15c (Fig. 3) against resistance of buffers 76. The buffers consist of plungers working in oil cylinders 77 formed in the body of the tail cylinder 34 and parallel to its principal bore. These buffers are backed by coil springs 78 and by oil under pressure. The oil is supplied to the cylinders 77 through small bleeds 79 extending from the cross-bore 64 in communication with the pressure pipe 63 (Fig.

10). The bleeds 79 are made small so that oil can flow through them only at a relatively low rate, thereby causing the buffers 76 to function as efficient energy-absorbing mechanisms.

Speed control

The speed of the shear is primarily controlled by adjustment of the valve 41. If desired, a like adjustment of the valve 64 may be made. This latter adjustment does not control the cutting speed but controls the speed of the return stroke. Further adjustment may be made by controlling the pump 37 so as to adjust the pressure delivered by the pump to the chamber 39.

My invention has many advantages. It constitutes a self-contained unit. No external steam connections are required. There is no requirement for a steam boiler plant and the shear may be positioned independently of steam piping in the mill. The shear does not limit the mill speeds, as has frequently been the case heretofore, but, to the contrary, permits increased operating speeds. It is rugged, compact, operates with certainty, and cuts successive pieces within very close tolerances.

I have illustrated and described a present preferred embodiment of the invention, but it will be understood that this is by way of illustration only and that the invention may be otherwise embodied or practiced within the scope of the following claims.

I claim:

1. A flying shear comprising shear blades relatively movable from a starting position to effect a cutting stroke, a fluid-actuated ram for biasing a blade to its starting position, a second fluid-actuated ram of larger area than the first-mentioned ram, effective, when supplied with fluid under pressure, for overcoming the first-mentioned ram and effecting a cutting stroke, fluid cylinders for the rams, means for supplying fluid under pressure at substantially all times to the cylinder for the first-mentioned ram and means for supplying pressure fluid to and releasing pressure fluid from the cylinder for the second-mentioned ram.

2. A flying shear comprising shear blades relatively movable from a starting position to effect a cutting stroke, a fluid-actuated ram for biasing a blade to its starting position, a second fluid-actuated ram of larger diameter than the first-mentioned ram, effective, when supplied with fluid under pressure, for overcoming the first-mentioned ram and effecting a cutting stroke, cylinders for the rams, a source of fluid under pressure, a substantially constantly open passage between the fluid pressure source and the first-mentioned ram, and a valved passage between the fluid pressure source and the second ram.

3. A flying shear comprising shear blades relatively movable from a starting position to effect a cutting stroke, a shear-actuating member having oppositely extending rams, one ram being of larger cross-sectional area than the other, fluid cylinders for the rams, means for supplying fluid under pressure at substantially all times to the cylinder for the smaller ram, and means for controlling the supply of pressure fluid to and the relief of pressure fluid from the cylinder for the larger ram.

4. A flying shear comprising shear blades relatively movable from a starting position to effect a cutting stroke, a shear-actuating member having oppositely extending rams, one ram being of larger cross-sectional area than the other, fluid cylinders for the rams, means for supplying fluid under pressure at substantially all times to the cylinder for the smaller ram, valve means for controlling the supply of pressure fluid to and the relief of pressure fluid from the cylinder for the larger ram, and means actuated by the movement of the shear-actuating member for controlling the valve.

5. A flying shear comprising shear blades relatively movable from a starting position to effect a cutting stroke, a shear-actuating member having oppositely extending rams, one ram being of larger cross-sectional area than the other, fluid cylinders for the rams, means for supplying fluid under pressure at substantially all times to the cylinder for the smaller ram, valve means for controlling the supply of pressure fluid to and the relief of pressure fluid from the cylinder for the larger ram, a valve-actuating means for urging the valve to a position to admit pressure fluid, a trip adapted to restrain the valve from such movement until the trip is actuated, a valve-return means for effecting return movement of the valve and means for rendering the valve-return means effective on movement of the shear-actuating member.

6. A flying shear comprising shear blades relatively movable from a starting position to effect a cutting stroke, a shear-actuating member having oppositely extending rams, one ram being of larger cross-sectional area than the other, fluid cylinders for the rams, means for supplying fluid under pressure at substantially all times to the cylinder for the smaller ram, valve means for controlling the supply of pressure fluid to and the relief of pressure fluid from the cylinder for the larger ram, fluid pressure-actuating means effective when supplied with fluid under pressure for urging the valve to a position to admit pressure fluid to the cylinder for the larger ram, a trip adapted to restrain the valve from such movement until the trip is actuated, a valve return means effective for causing return movement of the valve when the valve-actuating means is cut off from fluid under pressure, and means controlled by the shear-actuating member for controlling the supply of fluid to the valve-actuating means.

7. A flying shear comprising shear blades relatively movable from a starting position to effect a cutting stroke, a shear-actuating member having oppositely extending rams, one ram being of larger cross-sectional area than the other, fluid cylinders for the rams, means for supplying fluid under pressure at substantially all times to the cylinder for the smaller ram, valve means for controlling the supply of pressure fluid to and the relief of pressure fluid from the cylinder for the larger ram, fluid pressure-actuating means effective when supplied with fluid under pressure for urging the valve to a position to admit pressure fluid to the cylinder for the larger ram, a trip adapted to restrain the valve from such movement until the trip is actuated, a spring effective for causing return movement of the valve when the valve-actuating means is cut off from fluid under pressure, and means controlled by the shear-actuating member for controlling the supply of fluid to the valve-actuating means.

LORENZ IVERSEN.